(12) United States Patent
Handa et al.

(10) Patent No.: US 7,533,751 B2
(45) Date of Patent: May 19, 2009

(54) SWING ARM PIVOT STRUCTURE OF MOTORCYCLE OR THREE-WHEELED VEHICLE AND MOTORCYCLE OF THREE-WHEELED VEHICLE

(75) Inventors: Etsumi Handa, Saitama (JP); Katsumasa Mukai, Saitama (JP); Hisayoshi Kageyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 398 days.

(21) Appl. No.: 11/234,126

(22) Filed: Sep. 26, 2005

(65) Prior Publication Data

US 2006/0065463 A1 Mar. 30, 2006

(30) Foreign Application Priority Data

Sep. 30, 2004 (JP) ............................. 2004-287139

(51) Int. Cl.
    B62K 25/28 (2006.01)
(52) U.S. Cl. .................... 180/210; 180/215; 180/217; 180/219; 180/226; 180/227; 180/348; 180/349; 180/350; 180/351; 280/124; 280/128
(58) Field of Classification Search .......... 280/124.128; 180/210, 215, 217, 219, 226, 227, 348–351; B62K 025/28
    See application file for complete search history.

(56) References Cited

U.S. PATENT DOCUMENTS 5,480,001 A * 1/1996 Hara ........................... 180/227
6,073,719 A * 6/2000 Ohmika et al. ............... 180/219
6,189,638 B1 * 2/2001 Ito et al. ...................... 180/227
6,315,071 B1 * 11/2001 Gogo .......................... 180/219
6,588,529 B2 * 7/2003 Ishii et al. .................... 180/219
2003/0015365 A1 * 1/2003 Miyashiro .................... 180/227

FOREIGN PATENT DOCUMENTS

JP 59-18080 A 1/1984

* cited by examiner

Primary Examiner—Christopher P Ellis
Assistant Examiner—Jacob Meyers
(74) Attorney, Agent, or Firm—Birch, Stewart, Kolasch & Birch, LLP

(57) ABSTRACT

In a motorcycle or a three-wheeled vehicle which tiltably supports a proximal end portion of a swing arm which pivotally supports a wheel on a vehicle body frame by way of a pivot shaft, the swing arm pivot structure is inexpensive and can be easily assembled without particularly using relatively expensive bearings such as taper bearings. At the same time, the preload adjustment is no longer necessary thus facilitating the assembling operation and the maintenance operation. A proximal portion of the pivot shaft is connected to the swing arm in a state wherein the proximal portion is non-rotatable relative to the swing arm. At the same time, a distal portion of the pivot shaft is fitted in and held by the vehicle body frame in a state wherein the distal portion is rotatable relative to the vehicle body frame.

12 Claims, 5 Drawing Sheets

SWING ARM PIVOT STRUCTURE OF MOTORCYCLE OR THREE-WHEELED VEHICLE AND MOTORCYCLE OF THREE-WHEELED VEHICLE

CROSS-REFERENCE TO RELATED APPLICATIONS

The present non-provisional application claims priority under 35 USC 119 to Japanese Patent Application No. 2004-287139 filed on Sep. 30, 2004 the entire contents thereof is hereby incorporated by reference.

BACKGROUND OF THE INVENTION

1. Field of the Invention

The present invention relates to a motorcycle or a three-wheeled vehicle which tiltably supports a proximal end portion of a swing arm for pivotally supporting a wheel on a vehicle body frame by way of a pivot shaft and a swing arm pivot structure in the motorcycle or the three-wheeled vehicle.

2. Description of Background Art

In the above-mentioned conventional motorcycle, a structure is known in which a taper bearing is mounted in an inner sleeve of a swing arm with a pivot shaft being fixedly mounted on a vehicle body frame using bolts at a position corresponding to the taper bearing. An inner end portion of the pivot shaft is inserted into an inner peripheral portion of the above-mentioned taper bearing from the outside in the axial direction whereby the pivot shaft which is fixed to the vehicle body frame and the swing arm are mounted for relative rotation therebetween by way of the bearing. For example, see JP-A-59-18080.

However, the above-mentioned conventional structure has several drawbacks. More specifically, since a relatively expensive taper bearing is used between the pivot shaft and the swing arm, a cost is increased. Further, it is difficult to perform an operation to set a preload (pre-pressure) in the thrust direction which is performed at the time of inserting the pivot shaft into the taper bearing while fixedly mounting the pivot shaft to the vehicle body frame using bolts.

SUMMARY AND OBJECTS OF THE INVENTION

The present invention has been proposed in view of the above identified problems. It is an object of an embodiment of the present invention to provide the swing arm pivot structure for a motorcycle or a three-wheeled vehicle which can overcome the above-mentioned conventional drawbacks with a simple structure.

To achieve an embodiment of the present invention, a swing arm pivot structure of a motorcycle or a three-wheeled vehicle is provided which tiltably supports a proximal end portion of a swing arm for pivotally supporting a wheel on a vehicle body frame by way of a pivot shaft. A proximal portion of the pivot shaft is connected to the swing arm in a state wherein the proximal portion is non-rotatable relative to the swing arm. In addition, a distal portion of the pivot shaft is fitted in and held by the vehicle body frame in a state wherein the distal portion is rotatable relative to the vehicle body frame.

In addition, an embodiment of the present invention provides a bearing that is interposed between a fitting surface of the distal portion of the pivot shaft and a fitting surface of a bearing hole formed in the vehicle body frame.

Further, an embodiment of the present invention provides a collar which is capable of restricting the relative movement of the pivot shaft toward one side in the axial direction with respect to the vehicle body frame that is interposed between the bearing and the pivot shaft.

Still further, an embodiment of the present invention provides a swing arm pivot structure that is arranged between both left and right side portions of the proximal end portion of the swing arm and both left and right side portions of the vehicle body frame corresponding to the left and right side portions, respectively.

As described above, according to an embodiment of the present invention, the proximal portion of the pivot shaft is connected to the swing arm in a state that the proximal portion is non-rotatable relative to the swing arm. In addition, the distal portion of the pivot shaft is fitted in and held by the vehicle body frame in a state that the distal portion is rotatable relative to the vehicle body frame. Accordingly, it is possible to obtain the swing arm pivot structure which is inexpensive and can be easily assembled without particularly using the relatively expensive bearings such as taper bearings. Further, the preload adjustment is eliminated thus facilitating the assembling operation and the maintenance operation.

Further, according to an embodiment of the present invention, since the bearing is interposed between the fitting surface of the distal portion of the pivot shaft and the fitting surface of the bearing hole formed in the vehicle body frame, even when the pivot shaft is fixed to the swing arm side, a smooth relative rotation between the pivot shaft and the vehicle body frame is ensured whereby the swing arm can be smoothly tilted.

In addition, according an embodiment of the present invention, since the collar which is capable of restricting the relative movement of the pivot shaft toward one side of the axial direction with respect to the vehicle body frame is interposed between the bearing and the pivot shaft, due to the provision of the collar, it is possible to properly set the mounting position in the axial direction of the pivot shaft (accordingly, the swing arm) with respect to the vehicle body frame while ensuring a favorable face contact with the bearing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a mode for carrying out an embodiment of the present invention is explained based on embodiments illustrated in attached drawings.

Figure 1:
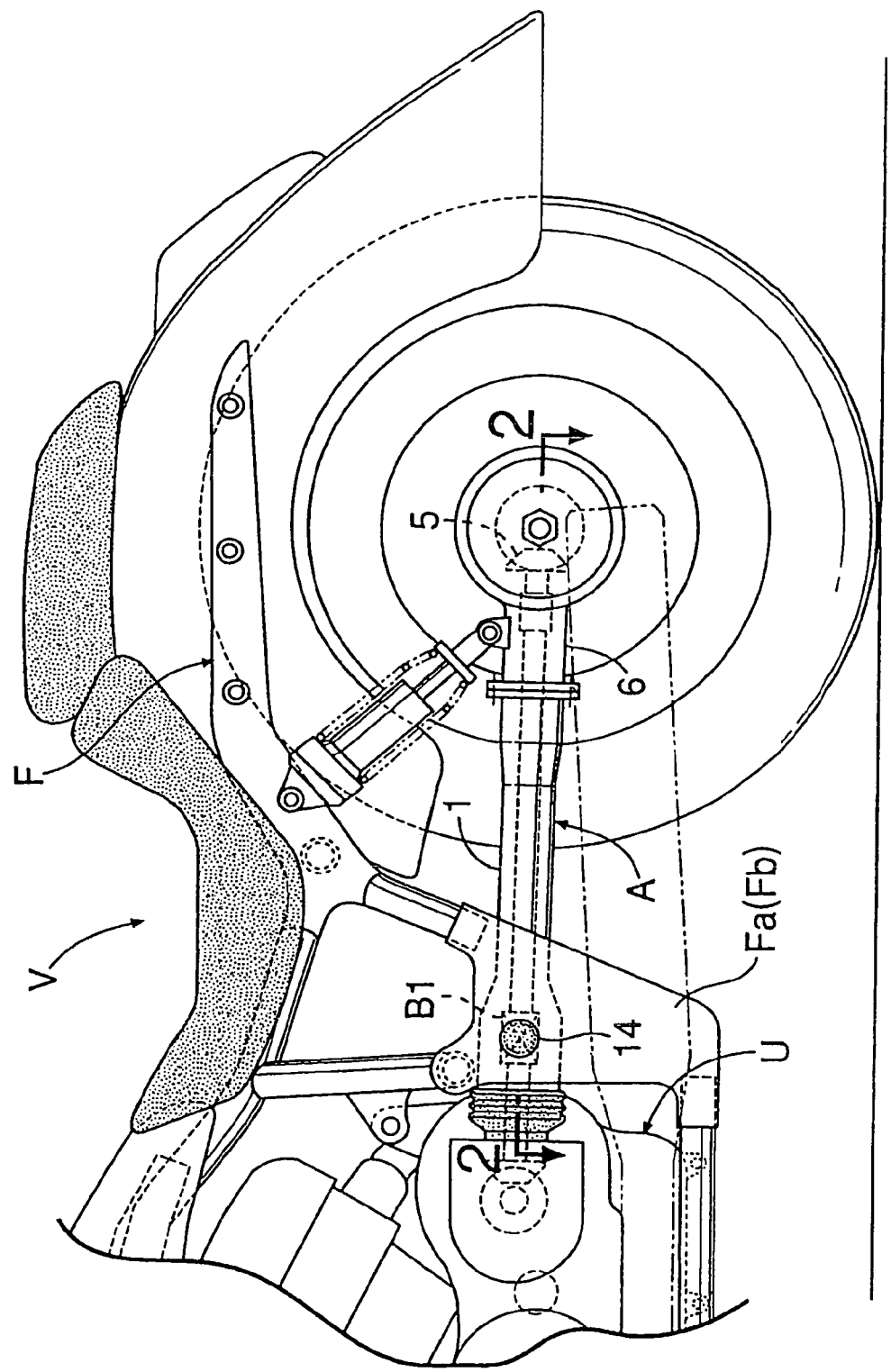
FIG. 1 is a rear side view of a motorcycle showing a first embodiment of the present invention.

As illustrated in FIG. 1, on a center portion of a vehicle body frame F of the motorcycle V, a power unit U that includes an engine and a transmission is mounted. Further, a proximal end portion, that is, a front end portion of a swing arm A is vertically tiltably mounted on the center portion by way of a pivot shaft P, and a rear wheel W is rotatably and pivotally supported on a distal end portion, that is, a rear end portion of the swing arm A. The rear wheel W and the power unit U are connected in an interlocking manner with each other by a shaft-drive-type power transmission mechanism as described hereinbelow.

The above-mentioned swing arm A includes, in an illustrated example, a pair of left and right rear fork pipes 1, 2, a front end cross member 3 which integrally joins front end portions of the rear fork pipes 1, 2, and an intermediate cross member 4 which integrally joins intermediate portions of the rear fork pipes 1, 2.

Further, to a rear end portion of one of the left and right rear fork pipes 1, a gear case 6 incorporates a bevel gear mechanism 5 which is joined to and is connected with the rear wheel W in an interlocking manner. Further, in the inside of the rear fork pipe 1, a propeller shaft 7, which allows the interlocking rotation of an output shaft of the power unit U and an input shaft of the bevel gear mechanism 5, is housed in a state wherein the propeller shaft 7 runs longitudinally in the pipe 1.

A front end portion of the propeller shaft 7 and the output shaft of the power unit U are connected with each other in an interlocking manner using a universal joint 8, wherein the universal joint 8 is housed in the inside of a joint casing 1a which is formed by bulging a front end portion of the above-mentioned one rear fork pipe 1 in a radial direction. Here, between a front-side element of the universal joint 8 and the output shaft of the power unit U or between a rear-side element of the universal joint 8 and the front end portion of the propeller shaft 7, the detachable spline joint structure is interposed. The rear-end element of the universal joint 8 and the front end portion of the propeller shaft 7 are connected with each other by way of the spline joint portion in a state wherein the relative rotation between these parts is prohibited. Accordingly, in assembling the swing arm A which incorporates the propeller shaft 7 into the vehicle body frame F, the shaft 7 and the output shaft side of the power unit U are connected with each other by way of the above-mentioned spline joint portion.

Figure 2:
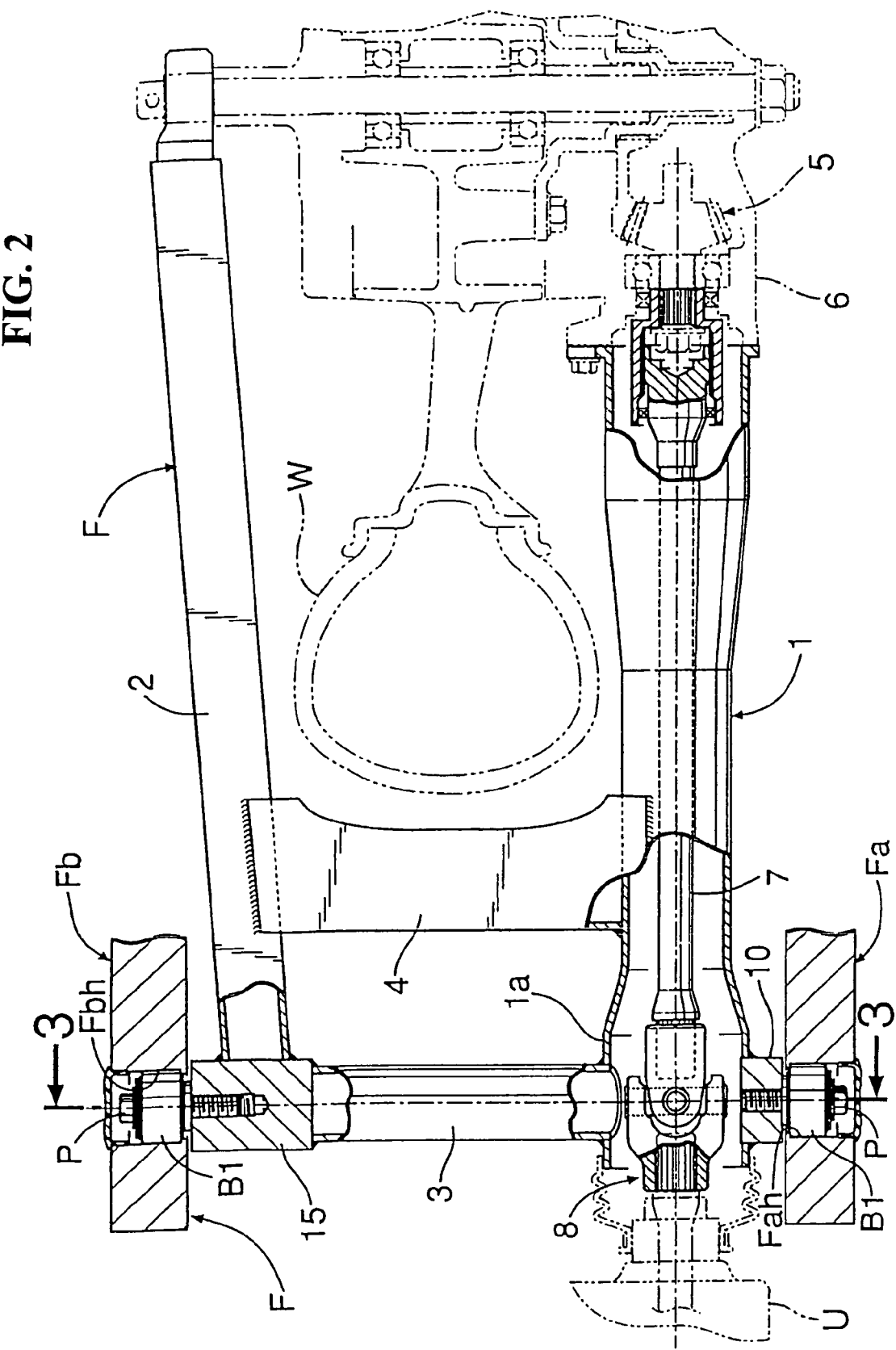
FIG. 2 is an enlarged cross-sectional view taken along a line 2-2 in FIG. 1.
Figure 3:
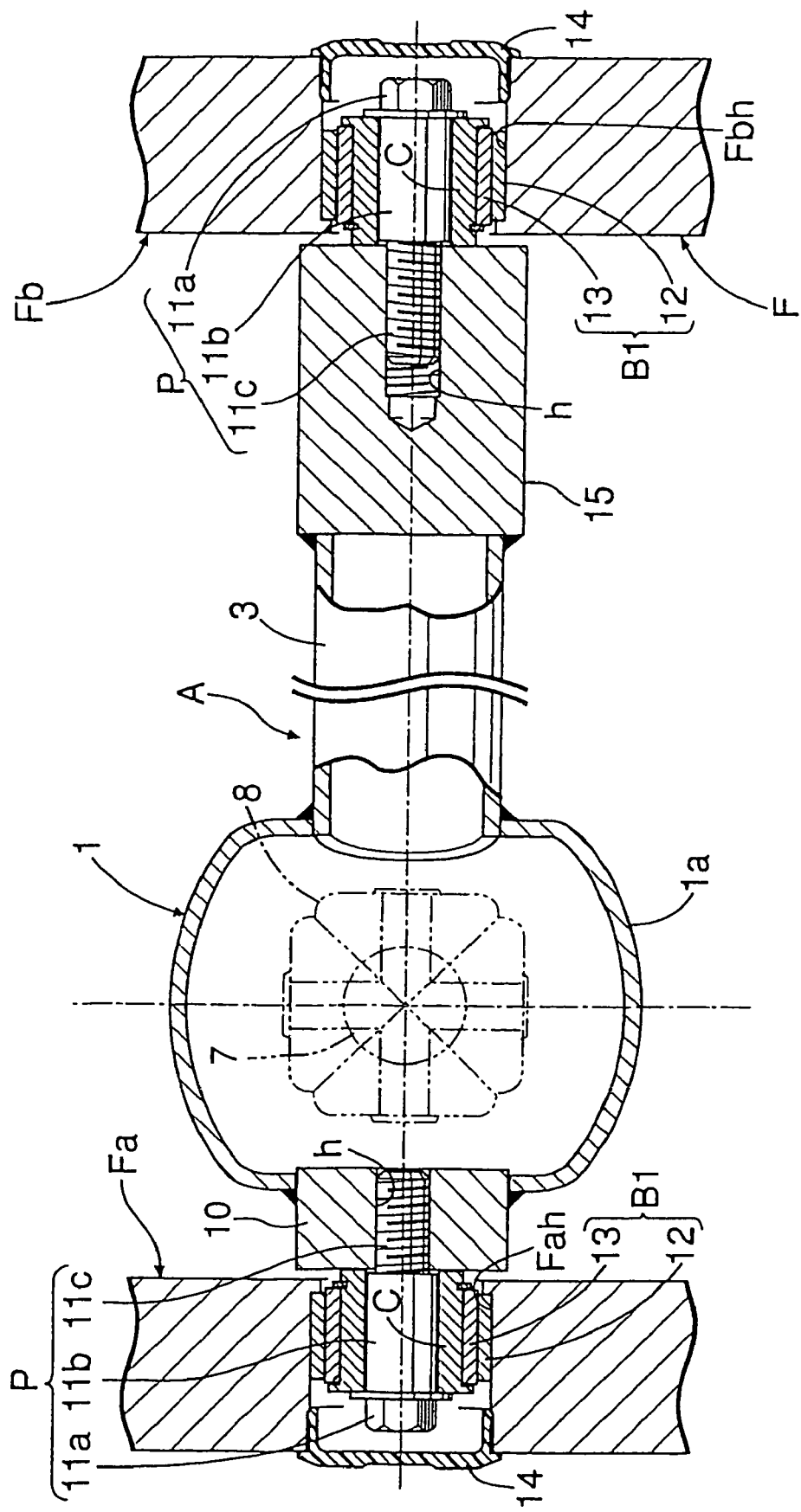
FIG. 3 is an enlarged cross-sectional view taken along a line 3-3 in FIG. 2.

Between both left and right side portions (that is, first and second support blocks 10, 15 described hereinbelow) of the proximal end portion, that is, the front end portion of the swing arm A and both left and right side portions Fa, Fb of the vehicle body frame F which are arranged close to the both left and right side portions of the proximal end portion of the swing arm A outside the swing arm A, a pair of left and right pivot mechanisms which tiltably support the swing arm A are respectively arranged. Next, the structure of the pivot mechanisms is specifically explained also in conjunction with FIG. 2 and FIG. 3.

To an outer wall of the front end portion (that is, joint casing 1a) of one of left and right rear fork pipes 1 on a side opposite to the front-end cross-member 3, the first support block 10 which bulges on an extension line of the cross member 3 from an outer surface of the outer wall is securely fixed, wherein an outer end surface of the first support block 10 constitutes a seat to which one of left and right pivot shafts P is securely fixed. The pivot shaft P includes a head portion 11a for engaging a tool, a columnar support shaft portion 11b which is integrally and contiguously formed with the head portion 11a, and a small-diameter threaded shaft portion 11c which is integrally and contiguously formed with the support shaft portion 11b, wherein a threaded pole h which allows the threading engagement of the threaded shaft portion 11c is formed in the above-mentioned first support block 10.

Further, in one lateral side portion Fa of the vehicle body frame F, a first bearing hole Fah is formed corresponding to the threaded hole h, wherein an outer tubular bushing, that is, an outer sleeve 12 of a metal bearing B1 is fitted in and fixed to the first bearing hole Fah by a fixing means such as press-fitting. In an inner peripheral surface of the outer sleeve 12, an inner tubular bushing, that is, an inner sleeve 13 of the metal bearing B1 is rotatably fitted, wherein the inner sleeve 13 is fitted and held on an outer periphery of a collar C which is fitted on a distal portion, that is, the above-mentioned support shaft portion 11b of the pivot shaft P. Accordingly, by threadedly inserting and fastening the proximal portion, that is, the above-mentioned threaded shaft portion 11c of the pivot shaft P which allows the collar C to be fitted on a distal portion thereof into the threaded hole h formed in the first support block 10, it is possible to mount the inner sleeve 13 on the pivot shaft P. Further, in an outer end opening portion of the above-mentioned first bearing hole Fah, a resilient cap 14 which covers the opening portion (accordingly, the head portion 11a of the pivot shaft P and the metal bearing B1) is detachably fitted.

Further, on another end portion of the front end cross-member 3, the second support block 15, which has an outer end surface thereof formed into a seat to which another lateral pivot shaft P is fixedly secured, is integrally mounted. A second bearing hole Fbh is formed in one lateral side portion Fb of the vehicle body frame F corresponding to the second support block 15.

Further, also between the second bearing hole Fbh and another lateral pivot shaft P, a metal bearing B1 is interposed that has substantially an equal constitution as the metal bearing B1 which is interposed between the above-mentioned first bearing hole Fah and one lateral pivot shaft P. Since the mounting structure of the metal bearing B1 is substantially equal to the mounting structure of the previously explained metal bearing B1, similar reference symbols are given to the corresponding constitutional members and the explanation thereof is omitted.

Next, the manner of operation of the above-mentioned first embodiment will be explained.

In mounting the swing arm A on the vehicle body frame F, in the bearing holes Fah, Fbh of both left and right side portions Fa, Fb of the vehicle body frame F, the respective outer sleeves 12 of the left and right metal bearings B1, B1 corresponding to the bearing holes Fah, Fbh are preliminarily fitted and fixed using fixing means such as a press fitting. Further, the inner sleeves 13 which are preliminarily held on the outer peripheries of the collars C are fitted in the inner peripheries of the respective outer sleeves 12. That is, in the above-mentioned bearing holes Fah, Fbh, the outer sleeves 12 and the inner sleeves 13 of the metal bearings B1, B1 and the collars C are collectively fitted together.

Then, the front end portion of the swing arm A is moved to a given assembling position between both left and right side portions Fa, Fb of the vehicle body frame F (that is, the position where the respective threaded holes h of the first and second support blocks 10, 15 and the bearing holes Fah, Fbh of both left and right side portions Fa, Fb are aligned coaxially). Next, while allowing the fitting engagement between the respective support shaft portions 11b of the left and right pivot shafts P and the above-mentioned collars C from the outside of the vehicle body frame F, the respective threaded shaft portions 11c of the pivot shafts P are respectively threaded into the respective threaded holes h of the first and the second support blocks 10, 15 thus fastening the left and right pivot shafts P, P to both left and right side portions (the first and the second support blocks 10, 15) of the swing arm A. Accordingly, the assembling operation of the left and right metal bearings B1, B1 and the pivot shafts P, P is completed.

In assembling the pivot shafts P, in place of inserting the pivot shafts P into the inside of the collars C in a state wherein the respective outer sleeves 12 and the respective inner sleeves 13 of the metal bearings B1, B1 and the collars C are collectively fitted in the bearing holes Fah, Fbh in the above-mentioned manner, it is also possible that the respective inner sleeves 13 of the metal bearings B1, B1 are preliminarily fitted on the respective support shaft portions 11b of the pivot shafts P before assembling by way of the collars C. In addition, while inserting the inner sleeves 13 into the outer sleeves 12, the respective threaded shaft portions 11c of the pivot shafts P are respectively threaded into the respective threaded holes h of the first and the second support blocks 10, 15.

According to the first embodiment, the proximal portions of the left and right pivot shafts P, P can be fixedly mounted on both left and right side portions (the first and the second support blocks 10, 15) of the swing arm A through the bearing holes Fah, Fbh formed in both left and right side portions Fa, Fb of the vehicle body frame F. At the same time, the distal portions of the pivot shafts P, P can be fitted in and held by the vehicle body frame F (the above-mentioned bearing holes Fah, Fbh) by way of the left and right metal bearings B1, B1 in a state wherein relative rotation between them is allowed. Accordingly, it is possible to obtain the swing arm pivot structure which can be assembled easily at a low cost without particularly using relatively expensive bearings such as taper bearings. Further, in mounting the respective metal bearings B1, the preload adjustment in no longer necessary. Thus, the assembling operation and the maintenance operation can be simplified. Still further, by interposing the metal bearings B1, B1 between the fitting surfaces of the pivot shafts P and the vehicle body frame F (the above-mentioned bearing holes Fah, Fbh), the relative rotation between the pivot shafts P and the vehicle body frame F becomes smooth whereby it is possible to allow the swing arm A to perform a smooth tilting.

Figure 4:
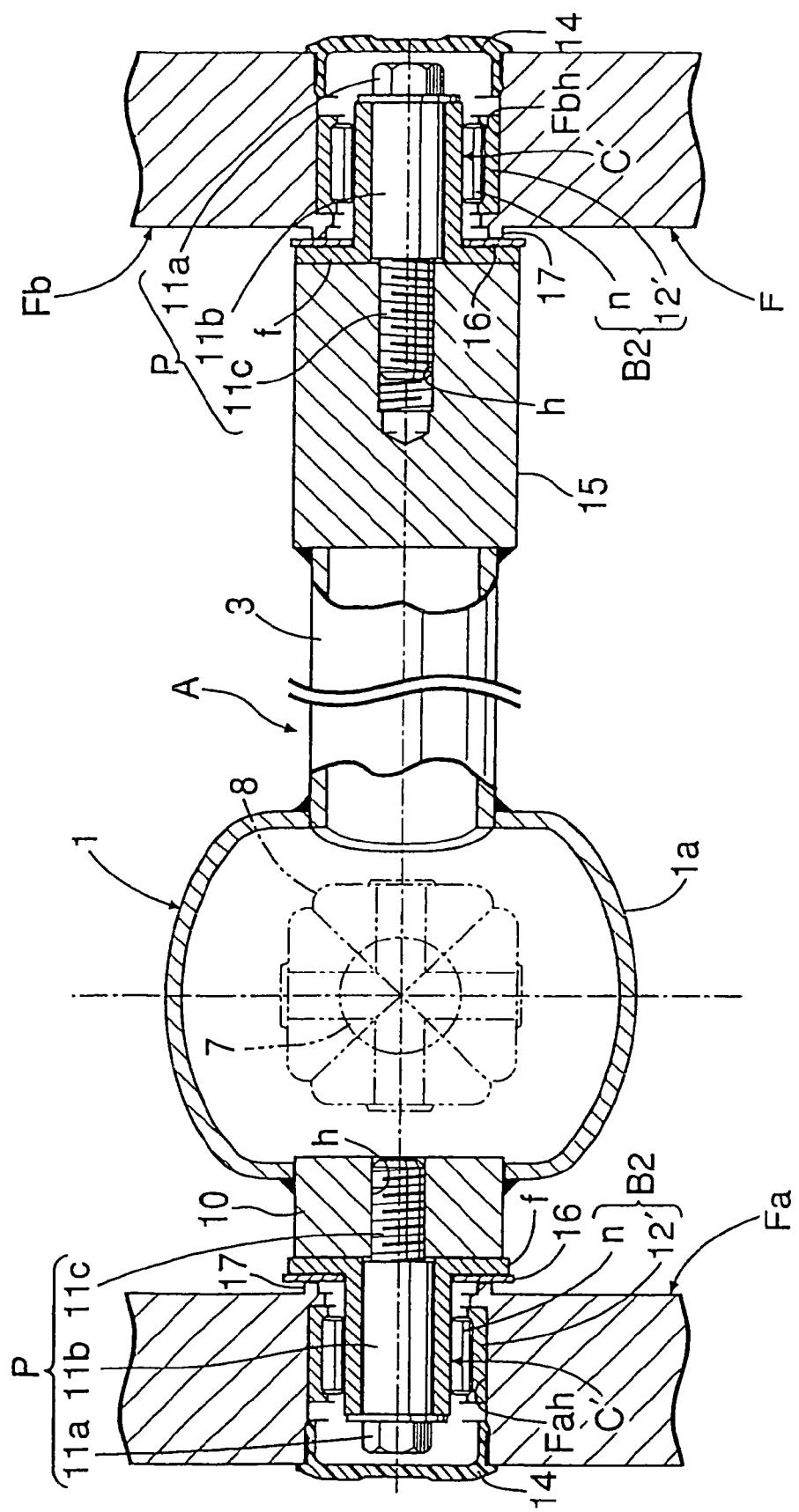
FIG. 4 is a cross-sectional view corresponding to FIG. 3 showing a second embodiment.

Next, the structure of a second embodiment of the present invention will be explained in conjunction with FIG. 4.

In this second embodiment, in place of the metal bearings B1 in the first embodiment, needle bearings B2 are adopted. Outer sleeves 12' of the needle bearings B2 are, in the same manner as the outer sleeves 12 of the metal bearings B1 in the preceding embodiment, preliminarily fitted and fixed to bearing holes Fah, Fbh formed in both left and right side portions Fa, Fb of a vehicle body frame F using fixing means such as press-fitting, while in annular recessed grooves formed in inner peripheral surfaces of the outer sleeves 12', a large number of needles n which are arranged in parallel in the circumferential direction are rotatably housed. Inside these needles n, collars C' which also function as retainer sleeves for retaining the needles n in the inside of the annular recessed grooves of the outer sleeves 12' are concentrically arranged, while inner peripheral surfaces of the collars C' are fitted and supported on support shaft portions 11b of pivot shafts P.

Further, to swing-arm-A-side end portions of the collars C', outwardly-directed flange portions f which are engaged with both left and right side portions (first and second support blocks 10, 15) of the swing arm A are integrally connected, while the flange portions f are engaged with inner surfaces of both left and right side portions Fa, Fb of a vehicle body frame (annular support projections 17 are mounted in a projecting manner on the inner surfaces in the peripheries of bearing holes Fah, Fbh in the illustrated example) by way of thrust washers 16 which are fitted on collars C' in a state wherein the flange portions f are rotatable relative to the inner surfaces of both left and right side portions Fa, Fb. Due to such an engagement, it is possible to surely restrict the relative movement of the collars C' and eventually the pivot shafts P (accordingly, the swing arm A) toward one axial side (the side where the swing arm A approaches both left and right side portions Fa, Fb of the vehicle body frame F) with respect to the vehicle body frame F. Further, a smooth relative rotation between the swing arm A and the vehicle body frame F is allowed.

In mounting the swing arm A of the second embodiment on the vehicle body frame F, in the bearing holes Fah, Fbh of both left and right side portions Fa, Fb of the vehicle body frame F, the respective outer sleeves 12' of the needle bearings B2, B2 corresponding to the bearing holes Fah, Fbh are preliminarily fitted and fixed using fixing means such as press fitting. Further, before the fixing operation, in annular recessed grooves formed in inner peripheries of the respective outer sleeves 12', the needles n are housed. At the same time, the collars C' are preliminarily assembled with thrust washers 16 thereon that are fitted in the inside of the needles n. That is, in the above-mentioned bearing holes Fah, Fbh, the outer sleeves 12' of the needle bearings B2, B2, the needles n, the collars C' and the thrust washers 16 are collectively fitted.

Thereafter, the front end portion of the swing arm A is moved to a given assembling position between both left and right side portions Fa, Fb of the vehicle body frame F (that is, the position where the respective threaded holes h of the first and second support blocks 10, 15 and the bearing holes Fah, Fbh of both left and right side portions Fa, Fb are aligned coaxially). Next, while allowing the fitting engagement between the respective support shaft portions 11b of the left and right pivot shafts P and the above-mentioned collars C' from the outside of the vehicle body frame F, the respective threaded shaft portions 11c of the pivot shafts P are respectively threaded into the respective threaded holes h of the first and the second support blocks 10, 15 thus fastening the left and right pivot shafts P, P to both left and right side portions (the first and the second support blocks 10, 15) of the swing arm A. Accordingly, the assembling operation of the left and right needle bearings B2, B2 and the left and right pivot shafts P, P is completed.

According to the second embodiment, the proximal portions of the left and right pivot shafts P, P can be fixedly mounted on both left and right side portions (the first and the second support blocks 10, 15) of the swing arm A through the bearing holes Fah, Fbh formed in both left and right side portions Fa, Fb of the vehicle body frame F. At the same time, the distal portions of these pivot shafts P, P can be fitted in and held by the vehicle body frame F (the above-mentioned bearing holes Fah, Fbh) by way of the left and right needle bearings B2, B2 in a state wherein the relative rotation between them is allowed. Accordingly, it is possible to obtain a swing arm pivot structure which can be assembled easily at a low cost without particularly using the relatively expensive bearings such as taper bearings. Further, in mounting the respective needle bearings B2, the preload adjustment is no longer necessary. Thus, the assembling operation and the maintenance operation can be simplified. Still further, by interposing the needle bearings B2, B2 between the fitting surfaces of the pivot shafts P and the vehicle body frame F (the above-mentioned bearing holes Fah, Fbh), the relative rotation between the pivot shafts P and the vehicle body frame F becomes smooth whereby it is possible to allow the swing arm A to perform a smooth tilting.

Further, in the second embodiment, between the needle bearings B2, B2 and the pivot shafts P, P, the collars C' which can restrict the relative movement of the pivot shafts P toward one axial side (the side where the swing arm A approaches both left and right side portions Fa, Fb of the vehicle body frame F) with respect to the vehicle body frame F is interposed. Accordingly, due to the provision of the collars C', it is possible to properly set the axial-direction mounting position of the pivot shafts P (eventually the swing arm A) with respect to the vehicle body frame F while ensuring a favorable face contact with the needle bearings B2, B2.

Further, between the proximal end portion of the swing arm A and left and right side portions Fa, Fb of the vehicle body frame F which is arranged close to the proximal end portion outside the swing arm A, the above-mentioned pair of left and right swing arm pivot mechanisms are arranged respectively. Accordingly, by merely restricting the relative movement of the pivot shaft P toward one axial side with respect to the vehicle body frame F with the use of the above-mentioned collars C', it is possible to hold the swing arm A at a proper position between both left and right side portions Fa, Fb of the vehicle body frame F whereby it is ensured that the uncontrolled movement of the swing arm A in the left and right directions is prevented.

Figure 5:
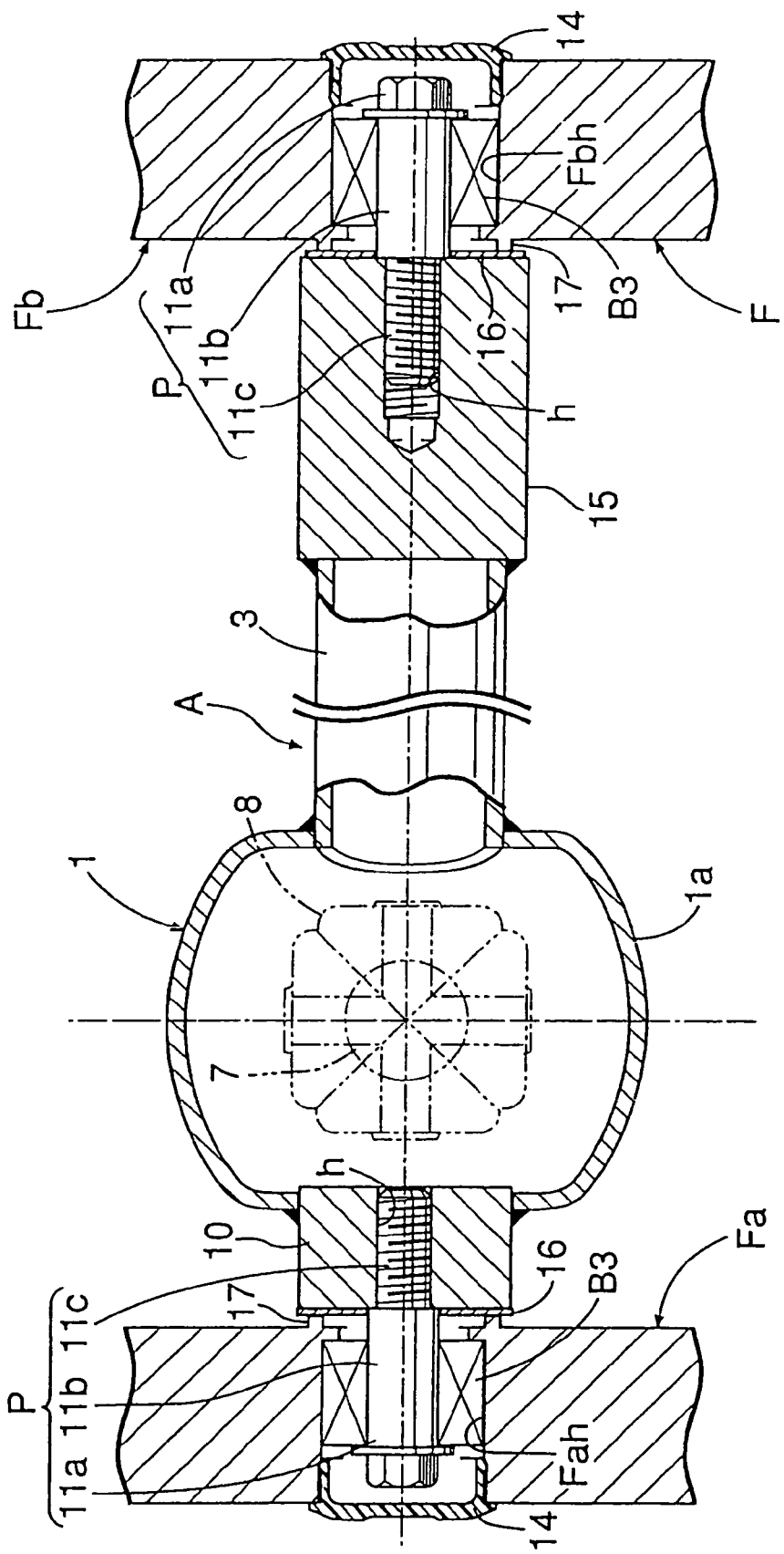
FIG. 5 is a cross-sectional view corresponding to FIG. 3 showing a third embodiment.

Next, the structure of the third embodiment of the present invention is explained in conjunction with FIG. 5. In this embodiment, the collars C, C' used in the preceding embodiments are omitted and the left and right pivot shafts P are detachably directly fitted in inner sleeves of left and right bearings B3, B3. The bearings B3, B3 which are used in this embodiment may be constituted of various bearings which require no setting of a preload (pre-pressure) in the thrust direction. For example, any one of a ball bearing, a roller bearing, a needle bearing and a metal bearing may be used. Accordingly, the bearings B3 are schematically illustrated in FIG. 5.

Further, outer sleeves of the bearings B3 are, in the same manner as the outer sleeves 12, 12' of the bearings B1, B2 of the preceding embodiments, preliminarily fitted in and fixed to bearing holes Fah, Fbh of the left and right side portions Fa, Fb of the vehicle body frame F using fixing means such as by press fitting. Further, ring-like thrust washers 16 are fitted on the respective pivot shafts P, wherein the thrust washers 16 are interposed between opposedly-facing surfaces of the inner side surfaces (annular projecting portions 17 formed on the inner side surface in a projecting manner around the periphery of the bearing holes Fah, Fbh) of both the left and right side portions Fa, Fb of the vehicle body frame F and both the left and right side portions (first and second support blocks 10, 15) of the swing arm A thus allowing a smooth relative rotation between these parts.

Then, by allowing both the left and right side portions (the first and second support blocks 10, 15) of the swing arm A and both the left and right side portions Fa, Fb of the vehicle body frame F to be engaged with each other by way of the thrust washers 16 in this manner, it is possible to surely restrict the relative movement of the pivot shafts P (accordingly, the swing arm A) toward one axial side (the side where the swing arm A approaches both left and right side portions Fa, Fb of the vehicle body frame F) with respect to the vehicle body frame F. At the same time, the smooth relative rotation between the swing arm A and the vehicle body frame F is allowed.

In mounting the swing arm A of the third embodiment on the vehicle body frame F, in the bearing holes Fah, Fbh of both left and right side portions Fa, Fb of the vehicle body frame F, the respective outer sleeves of the bearings B3, B3 corresponding to the bearing holes Fah, Fbh are preliminarily fitted and fixed using fixing means such as press fitting whereby the whole of the bearings B3, B3 is fitted into the bearing holes Fah, Fbh.

Then, the front end portion of the swing arm A is moved to a given assembling position between both left and right side portions Fa, Fb of the vehicle body frame F (that is, the position where the respective threaded holes h of the first and second support blocks 10, 15 and the bearing holes Fah, Fbh of both left and right side portions Fa, Fb are aligned coaxially). Next, while allowing the fitting of inner sleeves of the bearings B3, B3 and the thrust washers 16 on the respective support shaft portions 11b of the left and right pivot shafts P from outside of the vehicle body frame F, the respective threaded shaft portions 11c of the pivot shafts P are respectively threaded into the respective threaded holes h of the first and the second support blocks 10, 15 thus fastening the left and right pivot shafts P, P to both left and right side portions (the first and the second support blocks 10, 15) of the swing arm A. Accordingly, the assembling operation of the left and right bearings B3, B3 and the left and right pivot shafts P, P is completed.

According to the third embodiment, the proximal portions of the left and right pivot shafts P, P can be fixedly mounted on both left and right side portions (the first and the second support blocks 10, 15) of the swing arm A through the bearing holes Fah, Fbh formed in both left and right side portions Fa, Fb of the vehicle body frame F. At the same time, the distal portions of these pivot shafts P, P can be fitted in and held by the vehicle body frame F (the above-mentioned bearing holes Fah, Fbh) by way of the left and right bearings B3, B3 in a state wherein the relative rotation between them is allowed. Accordingly, it is possible to obtain a swing arm pivot structure which can be assembled easily at a low cost without particularly using the relatively expensive bearings such as taper bearings. Further, in mounting the respective bearings B3, the preload adjustment becomes no longer necessary. Thus, the assembling operation and the maintenance operation can be simplified. Still further, by interposing the bearings B3, B3 between the fitting surfaces of the pivot shafts P and the vehicle body frame F (the above-mentioned bearing holes Fah, Fbh), the relative rotation between the pivot shafts P and the vehicle body frame F becomes smooth whereby it is possible to allow the swing arm A to perform a smooth tilting.

Further, between the proximal end portion of the swing arm A and left and right side portions Fa, Fb of the vehicle body frame F which is arranged close to the proximal end portion outside the swing arm A, the above-mentioned pair of left and right swing arm pivot mechanisms are arranged, respectively. Further, by allowing both the left and right side portions of the swing arm A and both the left and right side portions Fa, Fb of the vehicle body frame F to be engaged with each other by way of the thrust washers 16, the relative movement of the pivot shafts P with respect to the vehicle body frame F toward one axial side (the side where the swing arm A approaches both left and right side portions Fa, Fb of the vehicle body frame F) is restricted. Thus, it is possible to hold the swing arm A at the proper position between both the left and right side portions Fa, Fb of the vehicle body frame F whereby it is ensured that the uncontrolled movement of the swing arm A in the left and right directions is prevented.

Although the embodiments of the present invention are explained in detail heretofore, the present invention is not limited to the above-mentioned embodiments and various design changes can be made.

For example, although the above-mentioned respective embodiments describe the case in which the present invention is applied to the swing arm pivot structure of a motorcycle, the present invention is applicable to the swing arm pivot structure for a three-wheeled vehicle.

Further, although the above-mentioned respective embodiments describe the case in which the present invention is applied to the pivot structure of the swing arm which incorporates the shaft-drive-type power transmission mechanism, the present invention is applicable to a vehicle which uses a power transmission mechanism (for example, a chain-drive-type mechanism) other than the shaft-drive-type power transmission mechanism.

Further, as the bearings used in the present invention, various kinds of bearings can be used which require no setting of a preload (pre-pressure) in the thrust direction during assembling. For example, in the second embodiment, ball bearings, roller bearings or metal bearings can be used in place of the needle bearings B2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A swing arm pivot structure of a motorcycle or a three-wheeled vehicle for tiltably supporting a proximal end portion of a swing arm for pivotally supporting a wheel on a vehicle body frame by way of a pivot shaft, comprising:
   a proximal portion of the pivot shaft being connected to the swing arm in a state wherein the proximal portion is non-rotatable relative to the swing arm and, at the same time, a distal portion of the pivot shaft is fitted in and held by the vehicle body frame in a state wherein the distal portion is rotatable relative to the vehicle body frame,
   wherein the vehicle body frame includes right and left portions sandwiching a front end cross member of the swing arm, each of the right and left portions of the vehicle body frame having a corresponding bearing hole, and
   wherein first and second bearings are respectively interposed between a fitting surface of the distal portion of the pivot shaft and a fitting surface of the corresponding bearing hole formed in each of the right and left portions of the vehicle body frame.

2. The swing arm pivot structure of a motorcycle or a three-wheeled vehicle according to claim 1, and further including first and second collars which are capable of restricting the relative movement of the pivot shaft toward one side of the axial direction with respect to the vehicle body frame, said first and second collars being respectively interposed between the first and second bearings and the pivot shaft.

3. The motorcycle or a three-wheeled vehicle according to claim 1, wherein said first and second bearings are press fitted on said distal portion of the pivot shaft.

4. The motorcycle or a three-wheeled vehicle according to claim 1, wherein each of the first and second bearings comprises a metal bearing interposed between the fitting surface of the distal portion of the pivot shaft and the fitting surface of the corresponding bearing hole formed in each of the right and left portions of the vehicle body frame.

5. The motorcycle or a three-wheeled vehicle according to claim 1, wherein each of the first and second bearings comprises a needle bearing interposed between the fitting surface of the distal portion of the pivot shaft and the fitting surface of the corresponding bearing hole formed in each of the right and left portions of the vehicle body frame.

6. The motorcycle or a three-wheeled vehicle according to claim 1, wherein each of the first and second bearings are positioned directly on the fitting surface of the distal portion and are interposed directly between the fitting surface of the distal portion of the pivot shaft and the fitting surface of the corresponding bearing hole formed in each of the right and left portions of the vehicle body frame.

7. A swing arm pivot structure for a vehicle comprising:
   a vehicle body frame;
   a swing arm;
   a pivot shaft tiltably supported at a proximal end portion of the swing arm to the vehicle body frame for pivotally supporting a wheel on the vehicle body frame by way of a pivot shaft; and
   a proximal portion of the pivot shaft being connected to the swing arm in a state wherein the proximal portion is non-rotatable relative to the swing arm and, at the same time, a distal portion of the pivot shaft is fitted in and held by the vehicle body frame in a state wherein the distal portion is rotatable relative to the vehicle body frame,
   wherein the vehicle body frame includes right and left portions sandwiching a front end cross member of the swing arm, each of the right and left portions of the vehicle body frame having a corresponding bearing hole, and
   wherein first and second bearings are respectively interposed between a fitting surface of the distal portion of the pivot shaft and a fitting surface of the corresponding bearing hole formed in each of the right and left portions of the vehicle body frame.

8. The swing arm pivot structure of a motorcycle or a three-wheeled vehicle according to claim 7, and further including first and second collars capable of restricting the relative movement of the pivot shaft toward one side of the axial direction with respect to the vehicle body frame, said first and second collars being respectively interposed between the first and second bearings and the pivot shaft.

9. The motorcycle or a three-wheeled vehicle according to claim 7, wherein said first and second bearings are press fitted on said distal portion of the pivot shaft.

10. The motorcycle or a three-wheeled vehicle according to claim 7, wherein each of the first and second metal bearings comprises a metal bearing interposed between the fitting surface of the distal portion of the pivot shaft and the fitting surface of the corresponding bearing hole formed in the vehicle body frame.

11. The motorcycle or a three-wheeled vehicle according to claim 7, wherein each of the first and second metal bearings comprises a needle bearing interposed between the fitting surface of the distal portion of the pivot shaft and the fitting surface of the corresponding bearing hole formed in the vehicle body frame.

12. The motorcycle or a three-wheeled vehicle according to claim 7, wherein each of the first and second bearings are positioned directly on the fitting surface of the distal portion and are interposed directly between the fitting surface of the distal portion of the pivot shaft and the fitting surface of the corresponding bearing hole formed in the vehicle body frame.

* * * * *